Jan. 3, 1956 E. P. O'DONNELL 2,729,464
TRAVELLING HOBBY HORSE
Filed Feb. 7, 1952
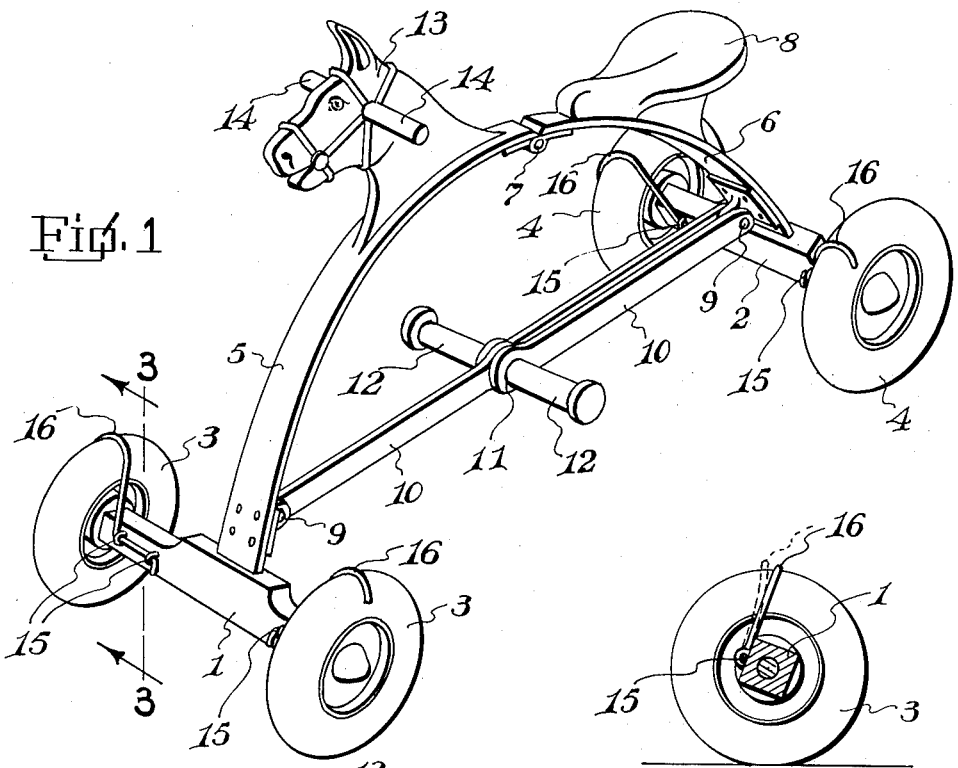
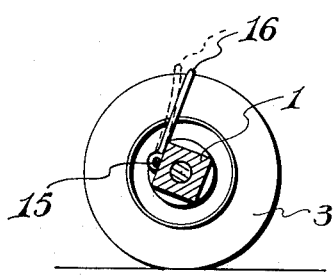
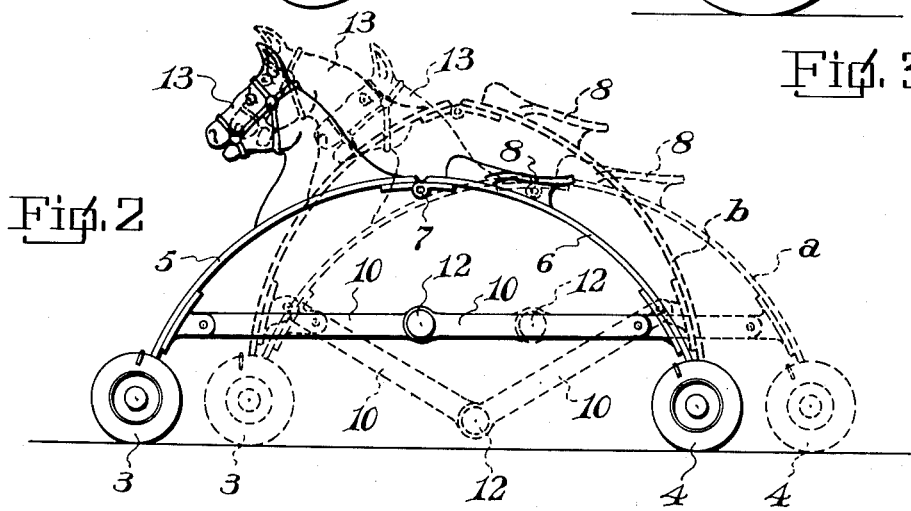
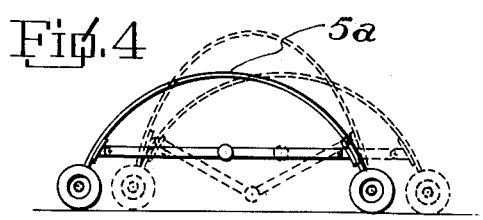
Edward P. O'Donnell
INVENTOR.
his Atty.

United States Patent Office 2,729,464
Patented Jan. 3, 1956

2,729,464

TRAVELLING HOBBY HORSE

Edward P. O'Donnell, Tulsa, Okla., assignor to Lyonal A. Babb and Thomas W. Babb, Liberal, Kans.

Application February 7, 1952, Serial No. 270,317

3 Claims. (Cl. 280—218)

The invention relates to wheeled toys of the hobby horse type, and has for its object to provide a device of this kind wherein intermittent forward motion is provided incident to the shifting of the weight of the rider from the seat to the actuating mechanism, in the form of pedals and linkage.

A further object is to provide a travelling hobby horse comprising spaced wheel carrying axles, which axles are connected together by an arcuate upwardly extending member, preferably formed from hinged sections, and provided with a seat and the double link connection between the ends of the arcuate members, and adapted to be depressed under the weight of the operator for intermittently advancing the rear axle and its wheels towards the front axle and its wheels, and to advance the front axle and its wheels when the weight is relieved from the pedals of the link connection and applied to the seat of the arcuate member. Brake means is provided on all wheels, of a type which will allow forward movement of the wheels and prevent backward rotation of the wheels.

With the above and other objects in view the invention resides in the combination and arrangement of parts as hereinafter set forth, shown in the drawings, described and claimed, it being understood that changes in the precise embodiment of the invention may be made within the scope of what is claimed, without departing from the spirit of the invention.

In the drawing:

Figure 1 is a perspective view of the wheeled toy.

Figure 2 is a side elevation of the wheeled toy showing in dotted lines the position of the parts during an advancing operation.

Figure 3 is a vertical transverse sectional view taken on line 3—3 of Figure 1.

Figure 4 is a side elevation of a modified form wherein the arcuate member is formed from a single piece of spring material.

Referring to the drawing, the numeral 1 designates the front axle of the wheeled toy, and 2 the rear axle. The front axle is provided with ground engaging wheels 3, and the rear axle 2 is provided with similar wheels 4.

Axles 1 and 2 are connected together by arcuate members 5 and 6, which members may be formed of spring material. Members 5 and 6 are hingedly connected at 7, and arcuate member 6 is provided with a seat 8. Hingedly connected at 9 to the lower ends of the arcuate members 5 and 6, adjacent the axles 1 and 2, are links 10 which extend towards each other below the arcuate members, and are hingedly connected together at 11 by a transverse foot engaging member 12. Arcuate member 5 is provided with a simulated horse's head 13 having handle grips 14 to be gripped by the operator while seated on the seat 8.

Anchored to the forward sides of the axles 1 and 2 at 15 are wheel engaging hooks 16, which hooks arch the upper sides of the wheels. It will be noted that the hooks are forward of the axis of the wheels, hence acting as brakes on the wheels to prevent backward movement of the device, but at the same time will allow forward rotation of the wheels for intermittently advancing the wheeled toy over the ground. If desired the wheels may be provided with ratchets.

In operation, the operator straddles the arcuate members and occupies the seat 8, however the operator alternately shifts his weight from the seat to the foot engaging members 12 and continues this movement. With this in mind, and referring to Figure 2, where the movement is shown in dotted and full lines, the initial position is shown in dotted lines a, and at which time the weight is on the seat 8; then the operator raises his weight from the seat 8 and applies the weight to the foot engaging members 12. This operation will force the links 10 to the angular dotted line position shown in Figure 2 and will simultaneously pull the rear axle 10 forwardly and bow upwardly the arcuate members 5 and 6, to the dotted line position shown at b. During this operation, the forward wheels 3 will be held against rearward movement by the brake 16 thereon, but the rear wheels 4 are advanced to the full line position shown in Figure 2. When the weight is shifted from the foot engaging members 12 to the seat, the links 10 are brought into alignment, as shown in full lines in Figure 2, and as the rear wheels 4 are held against retrograde rotation the forward wheels 3 will be advanced to the full line shown in Figure 2. The above operation continues, that is the shifting of the weight from the linkage to the seat, and the device intermittently advances over the ground.

Referring to the modified form shown in Figure 4, the arcuate member 5a is of spring material, and in a single piece, however the operation is the same.

From the above it will be seen that a wheeled toy is provided which will advance over the ground as the weight of the occupant is shifted from the seat to the advancing linkage.

The invention having been set forth what is claimed as new and useful is:

1. A wheeled toy adapted to be intermittently advanced over a surface, said toy comprising front and rear axles, wheels carried by said axles, means cooperating with said wheels for preventing rearward rotation thereof, an upwardly extending resilient arcuate member above said axles, the ends of said arcuate member being rigidly anchored to the axles, a double link connection between the ends of the arcuate member and connected to said arcuate member ends in a plane above and adjacent the axles, foot engaging members carried by the double link connection and forming means whereby said link connection can be broken downwardly for advancing the rear axle under the weight of the occupant, said arcuate member forming means for advancing the front axle when the weight of the occupant is shifted from the foot engaging members to the arcuate member, said arcuate member being formed in two sections hingedly connected to each other at a point directly above the foot engaging members.

2. A wheeled toy adapted to be intermittently moved over a surface comprising front and rear parallel axles, wheels rotatably carried by the axles, wheel engaging hooks upstanding from the axles and overlying the upper peripheries of the wheels for engaging on the wheels to prevent rearward movement thereof, an upwardly extending resilient arcuate member extending longitudinally between the axles and having its front and rear ends rigidly secured to the axles, a first link extending rearwardly from the front end of the member and pivotally connected thereto, a second link extending forwardly from the rear end of the member and pivotally connected thereto, said links having adjoining ends disposed under the center of the arcuate member, means pivotally connecting said adjoining ends together for downward swinging movement, foot engaging members carried by said foregoing means whereby said link connection can be broken downwardly for advancing the rear axle under the weight of an occupant standing on the foot engaging members, and a seat provided on the arcuate member, which forms means for advancing the front axle when the weight is shifted from the foot engaging members to the arcuate member.

3. A wheeled toy as claimed in claim 2, wherein said means pivotally connecting the links includes a pivot pin transversely extending through eyes on the adjoining ends of the links, said pin extending laterally in opposite directions from the links to constitute the foot engaging members.

References Cited in the file of this patent

UNITED STATES PATENTS

| | | |
|---|---|---|
| 1,616,839 | Arleigh | Feb. 8, 1927 |
| 2,379,192 | Sebel | June 26, 1945 |
| 2,635,886 | Schoebel | Apr. 21, 1953 |

FOREIGN PATENTS

| | | |
|---|---|---|
| 557,969 | Great Britain | Dec. 14, 1943 |